United States Patent [19]
Nitta

[11] 3,842,318

[45] Oct. 15, 1974

[54] SHIELDED METAL ENCLOSED ELECTRICAL EQUIPMENT

[75] Inventor: Tohei Nitta, Amagasaki, Japan

[73] Assignee: Westinghouse Electric Corporation, Pittsburgh, Pa.

[22] Filed: June 19, 1973

[21] Appl. No.: 371,446

Related U.S. Application Data

[63] Continuation of Ser. No. 296,716, Oct. 11, 1972, abandoned.

[52] U.S. Cl......................... 317/62, 315/36, 317/70
[51] Int. Cl. ............................................. H02h 9/06
[58] Field of Search ............. 317/61, 62, 70; 315/36

[56] References Cited
UNITED STATES PATENTS

| | | |
|---|---|---|
| 2,993,970 | 7/1961 | Yanagisawa....................... 317/62 X |
| 3,099,770 | 7/1963 | Sorrow et al. ..................... 317/62 X |
| 3,624,450 | 11/1971 | Graybill ............................... 317/62 |
| 3,649,875 | 3/1972 | Nagai et al........................ 317/70 X |

*Primary Examiner*—James D. Trammell
*Attorney, Agent, or Firm*—G. H. Telfer

[57] ABSTRACT

A high voltage electrical device, such as a lightning arrester, enclosed in a grounded metal enclosure filled with a pressurized dielectric gas. The device is provided with an asymmetrical shield and grading means to control the voltage distribution across the device.

7 Claims, 2 Drawing Figures

PATENTED OCT 15 1974  3,842,318

SHIELDED METAL ENCLOSED ELECTRICAL EQUIPMENT

This is a continuation of application Ser. No. 296,716, filed Oct. 11, 1972, now abandoned.

BACKGROUND OF THE INVENTION

The present invention relates to high voltage electrical devices enclosed in a grounded metal enclosure and insulated by a pressurized gas, and more particularly, to means for controlling the voltage distribution across such a device.

More generally, the invention relates to high voltage, metal enclosed, gas insulated electrical systems. In such systems, the conductors or busses are enclosed in tubular metal enclosures filled with a pressurized gas of suitable properties such as sulphur hexafluoride. Associated devices such as circuit breakers, isolators, grounding switches and the like are also contained in metal enclosures so that a complete substation or other electrical system, can be made up of components contained in communicating metal enclosures and insulated by the pressurized gas. Such a system permits a substantial reduction in the space required, as well as increased reliability and safety and reduced maintenance, with the further advantage that it lends itself well to a modular design approach with resulting low installation costs.

The pressurized gas insulation used in these systems permits relatively close clearances between the grounded metal enclosure and the high voltage equipment contained within the enclosure. When a high voltage, such as the line to ground system voltage, is applied across a device in such close proximity to a grounded surface, however, the electric field is badly distorted and the performance of devices such as lightning arresters is adversely affected by the resulting non-uniformity of voltage distribution. Other devices such as coupling capacitors and high voltage bushings may also be adversely affected by non-uniform voltage distribution resulting from the relatively small clearance to adjacent grounded metal surfaces. Lightning arresters have been used in metal enclosures at relatively low voltages as in Harder U.S. Pat. No. 3,469,146, and have been proposed for high voltage, gas insulated systems as in Graybill U.S. Pat. No. 3,624,450, but no means for controlling the voltage distribution in such an arrangement has been available, except the conventional grading rings. Such grading rings are applied to the line terminal and for high voltage arresters they can be of very large size and high cost and do not necessarily result in the most desirable voltage distribution. Furthermore, they take up a great deal of space and are undesirable in a metal enclosed system for that further reason.

SUMMARY OF THE INVENTION

In accordance with the present invention, means are provided for controlling the voltage distribution across a lightning arrester, or other high voltage electrical device, enclosed in a grounded metal enclosure to obtain an essentially uniform voltage distribution, or any desired distribution of the voltage. This is accomplished by means of an asymmetrical shield which extends on one side of the arrester in a manner to progressively decrease the capacitance between the shield and the arrester, together with grading rings or other suitable means to insure a symmetrical field within the arrester. By properly designing such a shield, the voltage distribution across the arrester can be made substantially uniform or, if desired, any other type of voltage distribution may be obtained. Thus, a standard arrester can be used in a gas insulated metal enclosure and its performance is substantially unaffected by the presence of a grounded surface in close proximity to the arrester, so that its operation is essentially the same as in the more usual outdoor environment.

BRIEF DESCRIPTION OF THE DRAWINGS

The invention will be more fully understood from the following detailed description, taken in connection with the accompanying drawings, in which.

DESCRIPTION OF THE PREFERRED EMBODIMENTS

Figure 1:
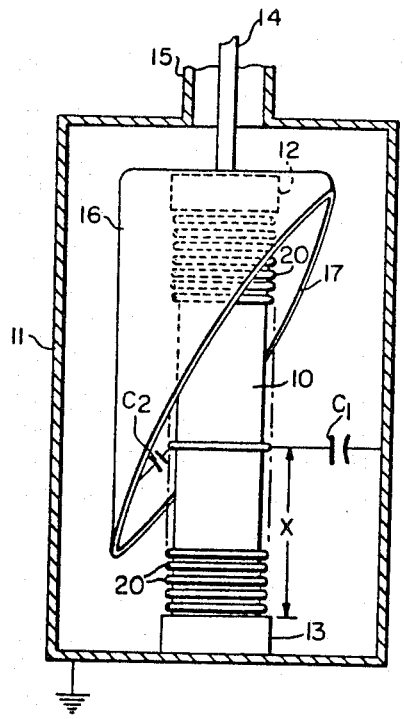
FIG. 1 is a somewhat diagrammatic view of a shielded lightning arrester enclosed in a gas insulated metal enclosure.

There is shown in FIG. 1 a metal enclosed lightning arrester illustrating the principles of the invention. As shown, a lightning arrester 10 is disposed within a metal enclosure 11 which would normally be grounded as indicated. The enclosure 11 is generally cylindrical to enclose the arrester 10 with a clearance between the enclosure and the arrester. The enclosure 11 is filled with a suitable gas for insulation, such as sulphur hexafluoride at a pressure of 45 psig, although other suitable gases or pressures might be used. The pressurized gas insulation makes possible a relatively small clearance between the arrester and the enclosure and thus reduces the space required for the installation. It will be understood that the metal enclosed, gas insulated systems to which the invention relates are primarily intended for use in substations on high voltage transmission systems. Thus, these gas insulated systems have been designed for voltages in the range of 69 KV to 345 KV, for example, although they can obviously be used for other voltages. At these high voltages, the saving in space due to the reduced clearances is very significant. The relatively small clearances to ground, however, result in the problem of non-uniform voltage distribution mentioned above which would adversely affect the performance of lightning arresters and certain other devices such as coupling capacitors.

The arrester 10 has not been illustrated in detail as it may be any standard or conventional type of lightning arrester having an insulating housing and having a line terminal means 12 at one end and a ground terminal means 13 at the other end. The terminal means 12 and 13 have been illustrated as metal end caps and will be understood as including any usual or necessary terminal devices for connection to line and ground, respectively. A line conductor 14 which may be a rod-like member, either solid or tubular, is connected to the line terminal means 12 for connection to the equipment to be protected by the arrester, and the conductor 14 is contained in a tubular metal enclosure 15 which communicates with the enclosure 11 and forms part of a complete metal enclosed substation or other electrical system.

In the conventional use of a lightning arrester such as the arrester 10, it is supported on a substation structure or platform support, or other grounded supporting structure of some type, usually in the open air. In these circumstances, the voltage distribution across the arrester is substantially uniform, or can be made sufficiently uniform by conventional grading rings, and the performance of the arrester is determined on the basis of uniform voltage distribution. In the usual outdoor installation, the voltage distribution may be affected by stray capacitances to ground but most of the arrester is sufficiently remote from the grounded supporting structure that these capacitances are relatively small and do not seriously affect the voltage distribution. When the arrester is enclosed in a metal enclosure 11 as in FIG. 1, however, the presence of a grounded conducting surface in close proximity to the arrester over its entire length has a serious effect on the voltage distribution if no means are provided to control the electric field. The clearance between the enclosure 11 and the arrester 10 is necessarily relatively small, in order to obtain the advantages of the metal enclosed system discussed above, and the capacitances to ground between the arrester and the housing 11 are therefore relatively large so that the electric field is seriously distorted. The performance of a standard arrester would be adversely affected by the resulting non-uniformity of voltage distribution.

In accordance with the present invention, shielding means are provided to control the voltage distribution across the arrester itself and thus permit the satisfactory use of an arrester of standard design. As shown in FIG. 1, an asymmetrical shield 16 is provided for this purpose. The shield 16, as shown somewhat diagrammatically in FIG. 1, is designed so as to substantially encircle the arrester 10 at the line terminal 12 and extends axially of the arrester on one side thereof in such a manner that the capacitance between the shield and the arrester decreases progressively along the length of the arrester. The shield 16 may take the form of a metal cylinder extending axially of the arrester and terminating on a plane, indicated at 17, which makes an acute angle with the axis of the arrester, so that the shield encircles the arrester at the line end and extends axially while progressively decreasing in circumferential extent towards the other end so that the capacitance between the shield and the arrester progressively decreases. It is necessary, of course, for the electric field within the arrester 10 itself to be symmetrical with respect to the axis of the arrester. In order to obtain this axial or cylindrical symmetry of the electric field, a series of grading rings 20 is provided on the outside of the arrester. The rings 20 are conducting rings which are separated from each other and extend from one end of the arrester to the other. Any suitable supporting means may be utilized to hold the rings in position uniformly spaced from each other from one end of the arrester to the other. The rings 20 thus float in potential and form a grading means inside the shield 16 which maintains a symmetrical field within the arrester itself.

As previously indicated, the voltage distribution across the arrester is strongly influenced by the capacitances to ground. As shown diagrammatically in FIG. 1, a capacitance $C_1$ exists between the grading rings 20, or the arrester, and the grounded enclosure 11 at each point along the length of the arrester. Similarly, a capacitance $C_2$ exists between the grading rings 20 and the shield 16 at every point along the length of the arrester as far as the shield 16 extends. It can be shown that the voltage at any point $x$ along the length of the arrester is proportional to the relation $C_2/C_1 + C_2$ at that point. It will be seen that the capacitance $C_1$ to ground is essentially constant from one end of the arrester to the other, and if the capacitance $C_2$ progressively decreases, a linear relation of the voltage to the height of the arrester can be made to exist and a substantially uniform voltage distribution can thus be obtained. It will also be apparent that the shield 16 might be designed so as to obtain any desired voltage distribution although in most cases a uniform distribution is desired. Thus, by means of the asymmetrical shield 16 with progressively decreasing capacitance between the shield and the arrester, the distorting effects of the grounded enclosure 11 are avoided and, with the aid of the grading rings 20 which make the field symmetrical within the arrester, a uniform voltage distribution is obtained and the performance of the arrester is essentially the same as it would be in the more usual environment. Thus, a standard lightning arrester can be utilized in the metal enclosure and the performance will be the same as that obtained in other surroundings. The advantages of the metal enclosed, gas insulated system can thus be obtained and lightning protection provided for the system or its components without sacrifice to the other desirable features of such a system.

Figure 2:
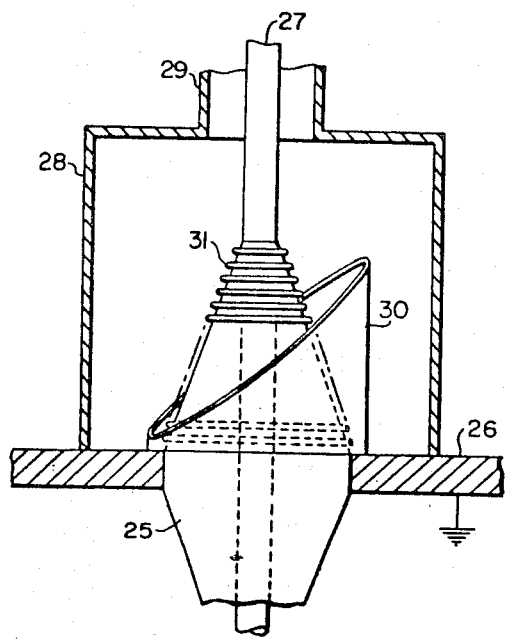
FIG. 2 is a similar view of a shielded high voltage terminal bushing.

The new asymmetrical shielding means is also applicable to other high voltage, metal enclosed devices of any type in which the performance may be effected by a non-uniform voltage distribution. Thus, for example, there is shown in FIG. 2 a high voltage terminal bushing for a metal enclosed system. The bushing may, for example, be a transformer terminal bushing, or it may be a so-called gas bushing terminating the metal enclosed system and providing connection to an overhead line.

As shown in FIG. 2, the insulating bushing 25 is mounted in a grounded wall 26 which may be a wall of a metal enclosure or which may be a transformer tank. The bushing 25 may be of porcelain, epoxy or other insulating material and may be of any suitable or usual design. The bushing 25 is mounted and sealed in the wall 26 in any usual manner and a conductor 27 extends through the bushing. The bushing 25 and conductor 27 are enclosed in a metal enclosure 28 which communicates with a tubular enclosure 29 for the conductor 27 and which forms part of a complete metal enclosed system. The enclosure 28 is filled with a suitable insulating gas, such as pressurized sulphurhexafluoride. As previously explained, the close proximity of the grounded surface 28 to the bushing 25 results in a distortion of the electric field and a non-uniform voltage distribution, which would require a longer or larger bushing than would normally be utilized for the system voltage in order to avoid the risk of external flashover. In order to make possible the use of a conventional bushing of normal size for the required voltage rating, an asymmetrical shield in accordance with the present invention may be utilized. As shown in FIG. 2, the shield 30 may be generally similar to the shield 16 of FIG. 1, but in this instance it encircles the ground end of the bushing 25 and extends axially toward the high voltage end, decreasing in circumferential extent progressively along the bushing. Grading rings 31, similar to the rings 20, are placed on the bushing 25 and are spaced from each other from one end of the bushing to the other within the enclosure 28.

The rings 31 may be held in position by any suitable means and float in potential to constitute a grading means to ensure a symmetrical electric field within the bushing itself. It will be apparent that capacitances exist between the shield and the bushing and between the bushing and the grounded enclosure as described above in connection with FIG. 1, and that the effect of the shield 30 in controlling the voltage distribution is the same as that previously explained so that a uniform voltage distribution is readily obtained in spite of the presence of the grounded enclosure 28.

It will now be apparent that shielding means has been provided to make it possible to obtain uniform voltage distribution across a lightning arrester or other high voltage electrical device enclosed in a grounded metal enclosure. This is an important new result since it makes it possible to use conventional or standard arresters or other devices, in a metal enclosed, gas insulated system with the same performance as in the more usual outdoor environment despite the presence of a grounded surface in close proximity to the arrester. This result is obtained by means of an asymmetrical shield in combination with the grading rings, or other grading means, for insuring symmetry of the electric field within the arrester. The asymmetrical shield is preferably designed in the manner described above to obtain a substantially uniform voltage distribution, although it will be apparent that it might be modified in any desired manner to obtain other types of voltage distribution and thus is an effective means for controlling the voltage distribution. The usefulness of the asymmetrical shield for this purpose is not limited to lightning arresters and it may be used in connection with any type of electrical device, such as coupling capacitors or terminal bushings, where the performance or the required size or design may be adversely affected by non-uniform voltage distribution. The new shielding means may therefore be used with any desired type of equipment and makes it possible to use standard devices in a grounded metal enclosure without adverse effect on their performance. Certain preferred embodiments, of the invention have been shown and described for the purpose of illustration, but it is to be understood that these embodiments are only illustrated and that the invention is capable of application in other specific forms.

I claim as my invention:

1. In combination, a grounded metal enclosure, an electrical device enclosed in said enclosure and adapted to have a high voltage applied thereto, said enclosure containing an insulating gas, an asymmetrical conducting shield at least partially surrounding said device to control the voltage distribution to ground across the device, and means encircling the device inside said shield to maintain a symmetrical field within the device.

2. The combination of claim 1 in which said shield extends from one end of the electrical device toward the other and progressively decreases in circumferential extent toward said other end.

3. The combination of claim 1 in which the last-mentioned means comprises a series of conductive rings spaced from each other and extending from one end of said electrical device to the other.

4. The combination of claim 3 in which said shield extends from one end of the electrical device toward the other end with decreasing circumferential extent such that the capacitance between the shield and said rings progressively decreases toward said other end.

5. The combination of claim 3 in which said shield is a cylindrical member encircling the electrical device at one end thereof and extending toward the other end, said cylindrical member terminating on a plane inclined to the axis of the device.

6. The combination of claim 5 in which the electrical device is a lightning arrester having a line terminal and a ground terminal, and the shield is in electrical contact with the line terminal.

7. The combination of claim 5 in which the electrical device is a conductor extending through an insulating bushing, and the shield encircles the bushing at the ground end thereof.

* * * * *